(12) United States Patent
Wippler (10) Patent No.: US 9,489,537 B2
(45) Date of Patent: Nov. 8, 2016

(54) PERSONAL INFORMATION PROTECTION FOR NAVIGATION SYSTEMS

(71) Applicant: Toyota Motor Engineering & Manufacturing North America, Inc., Erlanger, KY (US)

(72) Inventor: Eirk Anthony Wippler, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/595,643

(22) Filed: Jan. 13, 2015

(65) Prior Publication Data
US 2016/0203332 A1  Jul. 14, 2016

(51) Int. Cl.
  *G06F 7/04* (2006.01)
  *G06F 21/62* (2013.01)
  *G06F 21/31* (2013.01)

(52) U.S. Cl.
  CPC ........... *G06F 21/6245* (2013.01); *G06F 21/31* (2013.01)

(58) Field of Classification Search
  CPC .............................. G06F 21/31; G06F 21/6245
  USPC ........................................................ 726/28
  See application file for complete search history.

(56) References Cited

U.S. PATENT DOCUMENTS 7,692,533 B2   4/2010  Chiba et al.
8,487,740 B2   7/2013  Tsuruta et al.
2006/0095205 A1*  5/2006  Ihara ...................... G01C 21/26 701/431
2007/0160199 A1*  7/2007  Sekiguchi ............... G06F 21/10 380/28
2013/0151148 A1*  6/2013  Parundekar ........ G01C 21/3679 701/521

FOREIGN PATENT DOCUMENTS

EP       1909072 B1    7/2010

OTHER PUBLICATIONS

TomTom International B.V., Product Manual "TomTom", Copyright 2007, 61 pages.

* cited by examiner

*Primary Examiner* — Teshome Hailu
(74) *Attorney, Agent, or Firm* — Christopher G. Darrow; Darrow Mustafa PC (57) ABSTRACT

Arrangements related to the protection of personal information associated with a navigation system are described. The navigation system can be operatively connected to a data store of personal information. The data store of personal information is locked so that access to and/or use of data stored in the data store of personal information is prevented. Responsive to a receiving a request to access the data store of personal information, a user is prompted to provide authentication to unlock the data store of personal information. Responsive to receiving authentication, it is determined whether the received authentication is correct or incorrect. The data store of personal information is unlocked if the authentication is correct. The data store of personal information remains locked wherein if the received authentication is incorrect. One or more types of authentication can be required.

17 Claims, 3 Drawing Sheets

PERSONAL INFORMATION PROTECTION FOR NAVIGATION SYSTEMS

FIELD

The subject matter described herein related in general to navigation systems and, more particularly, to protecting personal information used in connection with navigation systems.

BACKGROUND

Many vehicles include a navigation system. The navigation system may be installed in a vehicle as original factory equipment or as an aftermarket addition. Some navigation systems are configured as a portable unit, allowing it to be selectively installed in and removed from one or more vehicles. Such portable navigation systems can also be used as handheld devices. Navigation systems can perform various functions. For instance, a vehicle navigation system can be used to determine a current location of the vehicle and/or determine a travel route between an origin and a destination. In some instances, the navigation system may store data relating to past usage of the navigation system for quick retrieval in the future.

SUMMARY

In one respect, the present disclosure is directed to a method of protecting personal information associated with a navigation system. A data store of personal information can be operatively connected to the navigation system. The method can include locking the data store of personal information. Thus, access to and/or use of the data store of personal information is prevented. The method can also include, responsive to a receiving a request to access a data store of personal information, prompting a user to provide authentication to unlock the data store of personal information. The method can further include, responsive to receiving authentication, determining whether the received authentication is correct or incorrect. The data store of personal information can be unlocked if the authentication is correct. The data store of personal information can remain locked if the received authentication is incorrect.

In another respect, the present disclosure is directed to a system for protecting personal information associated with a navigation system. The system includes a navigation system. The navigation system can include a data store of personal information and a processor operatively connected to the data store of personal information. The processor can be programmed to initiate executable operations. The executable operations can include locking the data store of personal information. Thus, access to and/or use of the data store of personal information is prevented. The executable operations can also include, responsive to a receiving a request to access the data store of personal information, prompting a user to provide authentication to unlock the data store of personal information. The executable operations can also include, responsive to receiving authentication, determining whether the received authentication is correct or incorrect. The data store of personal information can be unlocked if the authentication is correct. The data store of personal information can remain locked if the received authentication is incorrect.

DETAILED DESCRIPTION

This detailed description relates to protecting personal information associated with a navigation system. More particularly, a data store of personal information associated with a navigation system can be locked. Responsive to receiving suitable authentication, the data store of personal information can be unlocked for viewing, access and/or usage. The present detailed description relates to systems, methods and computer program products that incorporate one or more of such features. In at least some instances, such systems, methods and computer program products can improve security of personal information associated with a navigation system.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
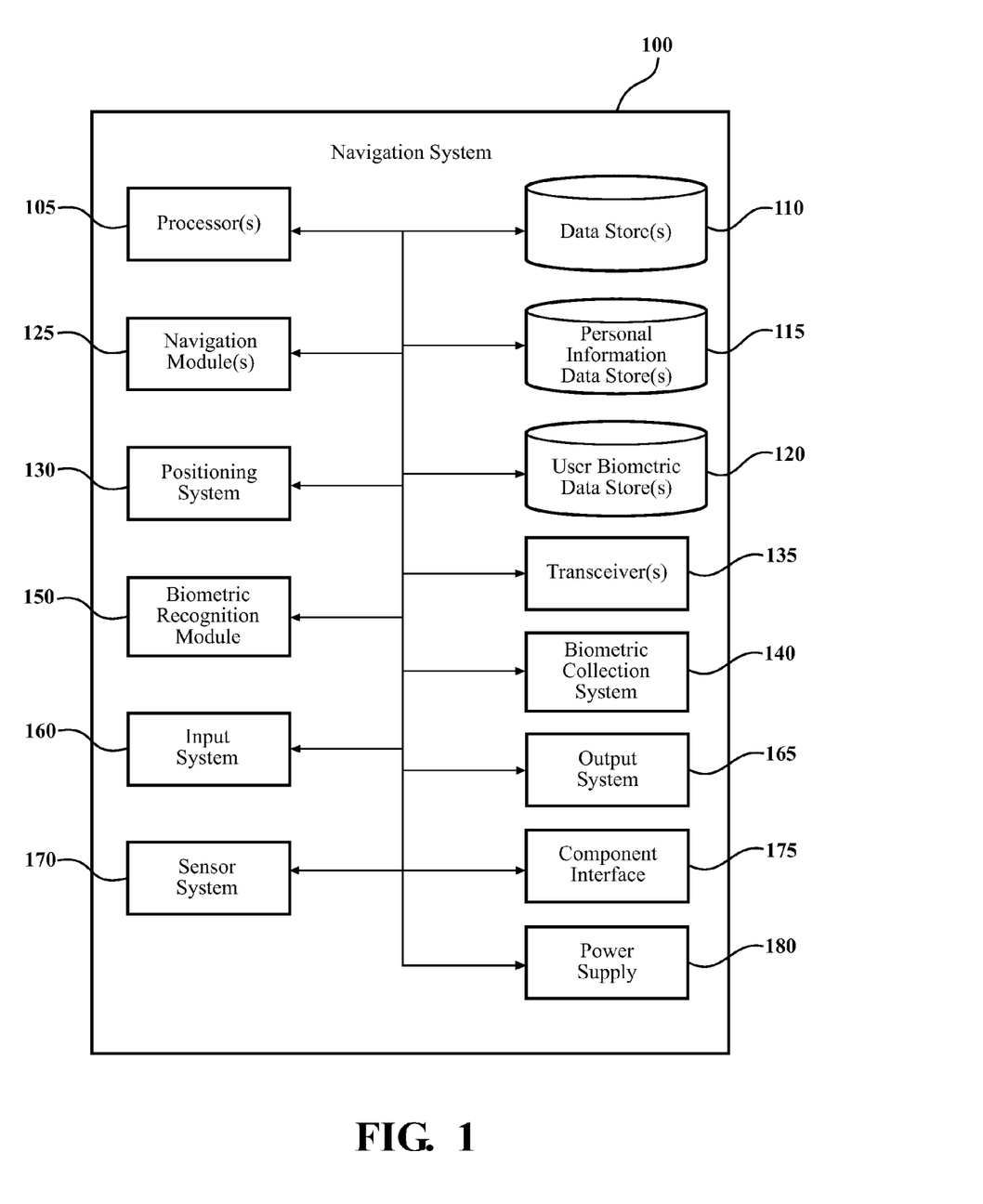
FIG. 1 is an example of a navigation system.

Referring to FIG. 1, an example of a navigation system 100 is shown. "Navigation system" means one or more mechanisms, devices, elements, components, systems, modules, applications and/or combinations thereof, now known or later developed, configured to at least determine a current geographic location of the navigation system (or a vehicle in which the system is located) and/or determine one or more travel routes between an origin and a destination.

Some of the possible elements of the navigation system 100 are shown in FIG. 1 and will now be described. It will be understood that it is not necessary for the navigation system 100 to have all of the elements shown in FIG. 1 or described herein. The navigation system 100 can have any combination of the various elements shown in FIG. 1. Further, the navigation system 100 can have additional elements to those shown in FIG. 1. In some arrangements, the navigation system 100 may not include one or more of the elements shown in FIG. 1. The various elements of the navigation system 100 can be operatively connected to each other in any suitable manner. The term "operatively connected," as used throughout this description, can include direct or indirect connections, including connections without direct physical contact. Further, the elements shown may be physically separated by large distances.

The navigation system 100 can include one or more processors 105. "Processor" means any component or group of components that are configured to execute processes (including any of the processes described herein) or any form of instructions to carry out such processes or cause such processes to be performed. The processor 105 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 105 can include at least one hardware circuit (e.g., an integrated circuit) configured to carry out instructions contained in program code. In arrangements in which there is a plurality of processors 105, such processors can work independently from each other or one or more processors can work in combination with each other.

The navigation system 100 can include one or more data stores 110 for storing one or more types of data. The data store 110 can include volatile and/or non-volatile memory. Examples of suitable data stores 110 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 110 can be a component of the processor 105, or the data store 110 can be operatively connected to the processor 105 for use thereby.

The one or more data stores 110 can include one or more personal information data stores 115. The one or more personal information data stores 115 can store one or more types of data relating to for personal information acquired by the navigation system 100 and/or input into the navigation system 100 by one or more users. "Personal information" is any information that is related to one or more users of a navigation system and/or past activities of one or more users of the navigation system. Examples of personal information include: names, home address, other addresses, any information that might identify a user, past locations or addressed visited, past origins, past destinations, past travel routes, phone numbers, prior search results, prior search terms, email addresses, contacts, contact history, images, photographs, and/or video just to name a few possibilities.

In some instances, at least a portion of the navigation system 100 can be used in combination with a communication device. The communication device can be operatively connected to at least a portion of the navigation system 100. The communication device can be, for example, a cellular phone, a smart phone, a tablet computer, a computer, a personal digital assistant or an entertainment device. In some instances, the communication device can be an auxiliary communication device operatively connected to output calls received by another communication device thereon. In one or more arrangements, the auxiliary communication device can be a handsfree device, including, for example, a Bluetooth headset.

The communication device can be communicatively coupled to the navigation system by any suitable type of direct or network connection, including any of those described herein as well as by Bluetooth, Bluetooth low energy (BLE), Infrared Data Association (IrDA), Ultra-wideband (UWB), Z-Wave, ZigBee and Near Field Communication (NFC) and/or direct wireless or wired communication, just to name a few possibilities.

Again, the communication device can be used in connection with the navigation system 100. For instance, the communication device can be operatively connected to output calls or messages (an electronic mail message, an instant message (IM), a Short Messaging System (SMS), etc.) between the communication device and a recipient can be output on at least a portion of the navigation system 100 received by the communication device on the navigation system 100, a vehicle system and/or a component shared with the navigation system (e.g. on a speaker or on a display). In such case, data related to such communications can be stored in the personal information data store 115. In one or more arrangements, personal information stored on the communication device may be accessed by the navigation system 100 and copied to and/or stored on the personal information data store 115.

In one or more arrangements, the personal information data store 115 can be located on the navigation system 100. In such case, the personal information data store 115 can be a part of the data store 110, or it can be separate from the data store 110. In one or more arrangements, the personal information data store 115 can be located in a source external to the navigation system 100 that is accessible by the navigation system 100.

As will be described in greater detail herein, the one or more personal information data stores 115 can be locked. "Locked" means that access to a personal information data store is prevented, the personal information data store is disabled, and/or the data stored in the personal information data store is encrypted or otherwise treated so that it is unreadable, inaccessible and/or unusable. In one or more arrangements, the locking of the one or more personal information data stores 115 can include any suitable encryption technology, now known or later developed. The one or more personal information data stores 115 can remain locked until suitable authentication is provided.

In one or more arrangements, the navigation system 100 may also require authentication to unlock or enable it for use. In such arrangements, the locking and/or unlocking of the personal information data store 115 can be independent from the locking and/or unlocking of the navigation system 100. Thus, the personal information data store 115 can be locked regardless of whether or not the navigation system 100 itself is locked or is configured to be locked. Such arrangements can permit the navigation system 100 to be used despite the personal information data store 115 being locked. Further, the data store of personal information 115 can be locked regardless of whether or not other data stores of the navigation system 100 or portions thereof are not locked or are not configured to be locked.

The locking of the personal information data store 115 can occur at any suitable time. In one or more arrangements, the one or more personal information data stores 115 can be locked up startup or activation of the navigation system 100, upon shutdown or deactivation of the navigation system 100, start-up or shut down of a vehicle that is operatively associated with the navigation system 100, after a predetermined period of nonuse of the navigation system 100, upon the navigation system 100 entering a sleep mode, when a request to access the personal information data store 115 is received, after each instance the personal information data store 115 is accessed, and/or if the vehicle is determined to be in motion, just to name a few possibilities. The locking of the personal information data store 115 can be formed automatically or responsive to a user input or command. In one or more arrangements, the personal information data store 115 can be locked by the processor 105, some other element and/or combinations thereof.

In one or more arrangements, the navigation system can include one or more user biometric data stores 120. The user biometric data store 120 can include biometric data of at least one authorized user of the navigation system 100. The biometric data can include, for example, images, scans, sounds files, measurements, etc. The biometric data can be provided in any suitable format. In one or more arrangements, the user biometric data store 120 can be located on the navigation system 100. In such case, the user biometric data store 120 can be a part of the data store 110, or it can be separate from the data store 110. In one or more arrangements, the user biometric data store 120 can be located in a source external to the navigation system 100 that is accessible by the navigation system 100.

In one or more arrangements, the user biometric data store 120 can include one or more images of at least one authorized user of the navigation system 100. The images may be of one or more portions of the body of authorized user(s) of the navigation system 100. For instance, the images can be of at least a portion of the face of an authorized user. Alternatively or in addition, the images can be of at least a portion of one or more of the user's palms, fingers, eyes, retinas and/or irises. The images can be provided in any suitable format.

The navigation system 100 can include a navigation module 125. The navigation module 125 can be implemented as computer readable program code that, when executed by a processor, implement various processes described herein. For instance, the navigation module 125 can be configured to: determine a current geographic location of the navigation system 100, determine one or more travel routes between an origin and a destination, and/or determine one or more revised travel routes based on a changed condition (e.g. route, location, traffic, accidents, road closures, etc.). However, it will be understood that the navigation system 100 can be configured to determine other things as well.

The navigation module 125 can be a component of and/or executed on the processor 105, or the navigation module 125 can be executed on and/or distributed among other processing systems to which the processor 105 is operatively connected. The navigation module 125 can include instructions (e.g., program logic) executable by the processor 105. Alternatively or in addition, the data store 110 may contain such instructions.

In one or more arrangements, the navigation module 125 can include, have access to and/or can execute one or more mapping applications or map data to determine a travel route between an origin and a destination. The origin or destination can be provided in any suitable manner. For instance, a user may input an origin and/or a destination. Alternatively or in addition, the navigation system 100 may obtain the origin and/or the destination in any suitable manner and/or from any suitable source. The mapping application can determine one or more suitable travel routes between the origin and the destination. A travel route may be selected based on one or more parameters (e.g. shortest travel distance, shortest amount of travel time, etc.). Such parameters can be configured by a user or by some other entity.

The navigation system 100 can include a positioning system 130, which can include, for example, a global positioning system, a local positioning system or a geolocation system. The positioning system 130 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the positioning system 130 can use Transmission Control Protocol (TCP) and/or a Geographic information system (GIS) and location services.

The positioning system 130 may include a transceiver (e.g. transceiver 135 and/or other transceiver) configured to estimate a position of the navigation system 100 (or a vehicle in which the navigation system 100 is located) with respect to the Earth. For example, positioning system 130 can include a GPS transceiver to determine the vehicle's latitude, longitude and/or altitude. The positioning system 130 can use other systems (e.g. laser-based localization systems, inertial-aided GPS, and/or camera-based localization) to determine the location of the navigation system 100 (or a vehicle in which the navigation system 100 is located).

Alternatively or in addition, the positioning system 130 can be based on access point geolocation services, such as using the W3C Geolocation Application Programming Interface (API). With such a system, the location of the navigation system 100 (or a vehicle in which the navigation system 100 is located) can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the navigation system 100 (or a vehicle in which the navigation system 100 is located) is determined will depend on the manner of operation of the particular location tracking system used.

The navigation system 100 can include one or more transceivers 135. A "transceiver" is defined as a component or a group of components that transmit signals, receive signals or transmit and receive signals, whether wirelessly or through a hard-wired connection. The transceiver 135 can be operatively connected to the processor 105, the data store 110, the personal information data store 115 and/or the user biometric data store 120. Any suitable transceiver can be used to access a network, access point, node or other electrical device for the transmission and receipt of data. The transceiver 135 may be a wireless transceiver using any one of a number of wireless technologies. Examples of suitable transceivers include a cellular transceiver, broadband Internet transceiver, local area network (LAN) transceiver, wide area network (WAN) transceiver, wireless local area network (WLAN) transceiver, personal area network (PAN) transceiver, body area network (BAN) transceiver, WiFi transceiver, WiMax transceiver, Bluetooth transceiver, 3G transceiver, 4G transceiver, ZigBee transceiver, WirelessHART transceiver, MiWi transceiver, IEEE 802.11 transceiver, IEEE 802.15.4 transceiver, or a Near Field Communication (NFC) transceiver, just to name a few possibilities. The transceiver 135 can include any wireless technology developed in the future. Again, the transceiver 135 can include one or more transceivers and can be any suitable combination of transceivers, including any combination of the transceivers noted above. However, it will be understood that arranged described herein are not limited to wireless transceivers. Indeed, the transceiver 135 can be configured for wired network connections.

The navigation system 100 can include a biometric collection system 140. The biometric collection system can include a camera. "Camera" is defined as any device, component, system or element that can capture visual data (e.g. image(s) or video(s)). The camera can include a lens and an image capture element. The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capturing element may capture color images and/or grayscale images. The image capture element may also include any suitable filters. Alternatively or in addition to the camera, biometric collection system 140 can include a biometric scanner and/or a biometric sensor that can collect biometric data (e.g. retinal, iris, facial, palm and/or fingerprint data) from a user. Thus, for example, the biometric collection system 140 can include a camera, a retina scanner, an iris scanner, a face scanner, a palm scanner and/or a fingerprint scanner. In one or more arrangements, the biometric collection system 140 can include a voice recorder or other audio capture device or element to collect a sample of a user's voice.

The navigation system 100 can include a biometric recognition module 150. The biometric recognition module is any device, component, system or element or groups thereof that can identify a biometric sample collected from a user. The biometric recognition module 150 can include, have access to and/or be operatively connected to the one or more user biometric data stores 120.

In one embodiment, the biometric recognition module 150 can include a facial recognition module, and the user biometric data stores 120 can include images of at least one authorized user of the navigation system 100. The facial recognition module can include and/or have access to the user images. The user images may be of one or more portions of the body of authorized user(s) of the navigation system 100. For instance, the images can be of at least a portion of the face of an authorized user. Alternatively or in addition, the images can be of at least a portion of one or more of the user's palms, fingers, eyes, retinas and/or irises. The images can be provided in any suitable format.

The biometric recognition module 150 can include any suitable biometric recognition software. The biometric recognition software can analyze a biometric sample from the user received by the biometric collection system 140. The biometric recognition software can query the user biometric data store 120 for possible matches. As will be described in more detail below, the personal information data store 115 can be unlocked if there is a match between the collected user biometric sample and an item in the user biometric data store 120.

As an example, the biometric recognition module 150 can include any suitable facial recognition software. The facial recognition software can analyze an image, which can be captured by a camera (not shown). The facial recognition software can query the user biometric data stores 120 for possible matches. For instance, images captured by a camera can be compared to any images in the user images in the user biometric data stores 120 for possible matches. Alternatively or in addition, measurements or other aspects of an image captured by the camera can be compared to measurements or other aspects of any images in the user biometric data stores 120.

Again, the facial recognition is provided in the way of an example. It will be understood that the biometric recognition module 150 is not limited to having facial recognition technology. Indeed, alternatively or in addition to being configured for facial recognition, the biometric recognition module 150 can be configured for iris recognition, retina recognition, palm recognition, fingerprint recognition, voice recognition and/or other biometric recognition, just to name a few possibilities. The above description of the facial recognition is equally applicable to these other types of biometric recognition.

The navigation system 100 can include an input system 160. An "input system" is defined as any device, component, system, element or arrangement or groups thereof that enable information/data to be entered into a machine. The input system 160 can receive an input from a user (e.g. a person, a vehicle occupant, etc.). Any suitable input system 160 can be used, including, for example, a keypad, display, touch screen, multi-touch screen, button, joystick, mouse, trackball, microphone and/or combinations thereof.

The navigation system 100 can include an output system 165. An "output system" is defined as any device, component, system, element or arrangement or groups thereof that enable information/data to be presented to a user (e.g. a person, a vehicle occupant, etc.). The output system 165 can include one or more visual outputs, including, for example, one or more displays. Alternatively or in addition, the output system 165 may include one or more audial outputs, including, for example, a microphone, earphone and/or speaker.

One or more components may serve as both a component of the input system 160 and a component of the output system 165. For example, a display may serve as both a component of the input system 160 and as a component of the output system 165.

In one or more arrangements, the navigation system 100 can include a sensor system 170. "Sensor" means any device, component and/or system that can detect, determine, assess, measure, quantify and/or sense something. In arrangements in which the sensor system 170 includes a plurality of sensors, the sensors can work independently from each other or one or more of the sensors can work in combination with each other. The sensor system 170 and/or the one or more sensors can be operatively connected to the processor 105, the data store 110, the personal information data store 115, the user biometric data store 120, the navigation module 125 and/or other element of the navigation system 100.

The sensor system 170 can include any suitable type of sensor. For example, in one or more arrangements, the sensor system 170 can include one or more sensors configured to detect, determine, assess and/or sense a predetermined input or signal. The predetermined input or signal can include unidirectional communications from an external source. Any suitable sensor(s) can be used depending on the predetermined input.

In one embodiment, the one or more sensors can be configured to detect signals from a Near Field Communication (NFC) source or other source, such as a beacon or transponder. Any suitable type of signal can be detected. For instance, the sensor system 170 can be adapted to detect specific radio frequency (RF) signals. In such case, the sensor system 170 can be adapted to detect RF signals emanating from a signal beacon or transponder. The sensor system 170 can receive such RF signals if the device is located sufficiently proximate thereto. Again, RF signals are provided merely as an example, as the sensor system 170 can be adapted to detect other types of signals.

In addition to the the sensor system 170, the navigation system 100 may also include a signal transmitter (not shown). In such case, the navigation system 100 itself can act like a signal beacon, as signals can emanate from the signal transmitter. The signal transmitter can be adapted to produce signals that cause one or more specific transponders to respond. Thus, if the navigation system 100 is located sufficiently close to a transponder, then the transponder can send a response, which can be received and detected by the sensor system 170.

The navigation system 100 may include a component interface 175. Additional elements can be operatively connected to the component interface 175, including, for example, a universal serial bus (USB) or other interface. The navigation system 100 may include a power supply 180. Any suitable power supply 180 can be used, including, for example, a battery.

The navigation system 100 can be used in connection with a vehicle. As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle may be a motorcycle, watercraft, an aircraft or any other form of motorized transport.

When the navigation system 100 is operatively associated with a vehicle, it will be understood that one or more of these elements can be located external to and/or remote from the vehicle. In one or more arrangements, one or more of the elements of the navigation system 100 can be provided together as a navigation unit that can be used in connection with the vehicle. In one or more arrangements, such a navigation unit can be installed in the vehicle. In one or more arrangements, such a navigation unit can be a portable navigation unit that can be selectively installed and removed from a vehicle. In such case, the navigation unit can be selectively used in a plurality of vehicles, as a handheld device and/or in one or more non-vehicular applications.

Further, one or more components of the navigation system 100 may also serve as a component or system of the vehicle. For instance, the navigation system 100 may use an in-vehicle display that may also be a display or interface for another vehicle system (e.g. a radio or audio system and/or a display or monitoring system).

According to arrangements described herein, the personal information data store 115 can be locked. As a result, access to and/or use of the information stored in the personal information data store 115 is prevented. Such locking of the personal information data store 115 can be implemented regardless of whether the navigation system 100 is locked or unlocked. Thus, even if the navigation system 100 is unlocked or is otherwise not configured or enabled to be locked, the personal information data store 115 will remain locked. However, in such case, the navigation system 100 can otherwise be used.

The personal information data store 115 can be locked until correct authentication is provided. "Correct authentication" means user provided authentication that exactly matches a predetermined authentication. In some embodiments, correct authentication can also mean that the user provided authentication and the predetermined authentication match within a predetermined probability (such as at least about 85%, at least about 90%, at least about 95% or greater) or confidence level. The navigation system 100 can be configured to store the predetermined authentication in any suitable location and in any suitable manner. The predetermined authentication can be input using any suitable user interface provided by the navigation system 100, including, for example, a settings screen.

Any suitable type of authentication can be provided to unlock the personal information data store 115. For instance, the authentication can be a password. The term "password" includes passwords, pass codes, personal identification numbers (PINs) and/or pattern locks. Alternatively or in addition, the authentication can be a predetermined signal, such as a specific radio frequency (RF) signal. Alternatively or in addition, the authentication can be a biometric identifier. Still other forms of authentication are possible. The user provided authentication can be input or collected using any suitable user interface provided by the navigation system 100.

In one or more arrangements, the navigation system 100 can be configured so that only one form of authentication is required to unlock the personal information data store 115. In one or more arrangements, the navigation system 100 can be configured so that two or more forms of authentication are required to unlock the personal information data store 115. The type of authentication and/or the quantity of authentication can be set by default, by a user or by some other entity.

Figure 2:
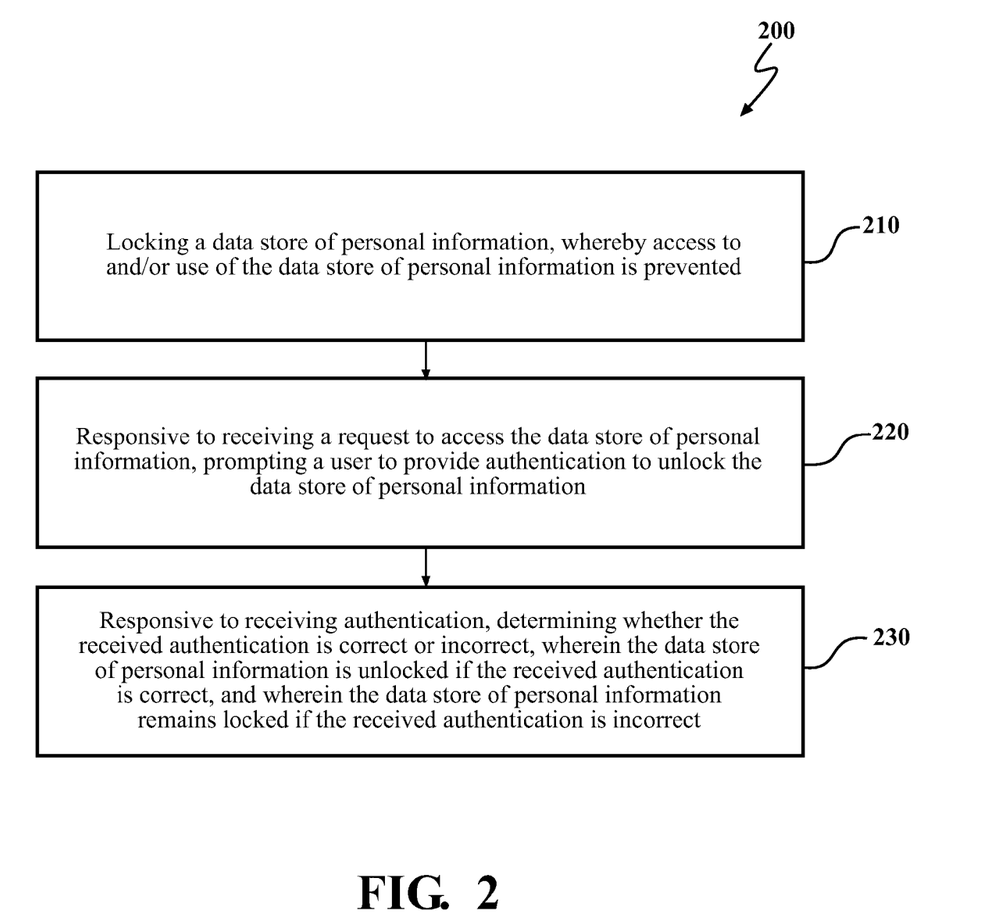
FIG. 2 is an example of a method of protecting personal information associated with a navigation system.

Now that the various potential systems, devices, elements and/or components have been described, various methods for protecting personal information associated with a navigation system will now be described. Referring now to FIG. 2, one example of a method of protecting personal information operatively associated with a navigation system is shown. A data store of personal information being operatively connected to the navigation system. Various possible steps of method 200 will now be described. The method 200 illustrated in FIG. 2 may be applicable to the embodiments described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, the data store of personal information 115 can be locked. As a result of the locking, access to and/or use of the data store of personal information is prevented. The locking can be performed automatically or upon user input, including in any of the manners described herein. In one or more arrangements, the locking of the data store of personal information 115 can be performed irrespective of whether the navigation system 100 is locked or unlocked. The method 200 can continue to block 220.

At block 220, a request to access or use the data store of personal information 115 can be received. Such a request may occur while a user is operating the navigation system 100. For instance, a user may wish to search for an address in a list of contacts stored on the data store of personal information 115. In response to receiving such a request, a user can be prompted to provide one or more forms of authentication to unlock the data store of personal information 115. The method can continue to block 230.

At block 230, one or more forms authentications can be received. In response to receiving authentication, it can be determined whether the received authentication is correct or incorrect. Any suitable form of authentication can be provided including any of those described above (e.g. password, predetermined signal, biometric sample, etc.). The data store of personal information 115 can be unlocked if the authentication is correct. As a result of such unlocking, the user can have access to or use of the data or information included in the data store of personal information 115. The data store of personal information 115 can remain locked wherein if the received authentication is incorrect. As a result, the user will not be able to access or use the data or information included in the data store of personal information 115.

Figure 3:
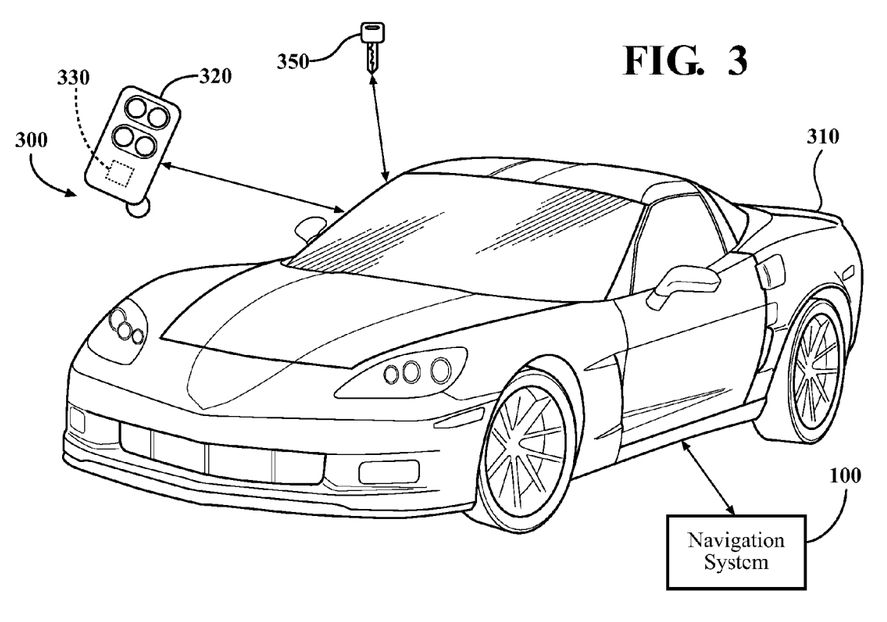
FIG. 3 is a system for protecting personal information associated with a navigation system.

A non-limiting example of protecting personal information operatively associated with a navigation system in accordance with systems and methods described herein will now be presented in relation to FIG. 3.

Referring to FIG. 3, an example of a system 300 is shown. The system 300 includes the navigation system 100 operatively connected to a vehicle 310. In one or more arrangements, the navigation system 100 can be permanently or temporarily installed in the vehicle 310. In one or more arrangements, one or more components of the navigation system 100 can also be a component of the vehicle 310.

The system 300 can also include a vehicle key 320. The vehicle key 320 can be used, directly or indirectly, to selectively lock and unlock the vehicle 310 in any known manner. Alternatively or in addition, the vehicle key 320 can be used at least in part to, directly or indirectly, selectively start and/or the turn off the vehicle 310. The vehicle key 320 can be any suitable type of key, such as a traditional key, a smart key, a keyless entry unit, etc. In one or more arrangements, the vehicle key 320 can include a signal generating element 330, which can be, for example, a transponder or other element that can general a signal. The signal generating element 330 can be any suitable signal generating technology, now know or later developed. In one or more arrangements, the signal generating element 330 may also be used to disarm a vehicle immobilizer, thereby allowing the engine of the vehicle 310 to be started. The signal generating element 330 can be embedded in the vehicle key 320 itself or a housing for the vehicle key 320.

In one or more arrangements, the system can further include a valet key 350. "Valet key" means any key that provides a lesser degree of functionality than a vehicle key. For instance, the valet key 350 may open one or more door locks of the vehicle 310 and/or may allow the vehicle 310 to be driven. However, there are some things that a user may not be able to do with the valet key 350. For example, the valet key 350 may not open a glove compartment of the vehicle 310. The valet key 350 may not include a signal generating element.

The system 300 shown in FIG. 3 can be used to protect the personal information stored on or associated with the navigation system 100 in various scenarios. For instance, a user may have the vehicle 310 parked by a valet service. The user may provide a valet with the vehicle key 320 to do so. The valet can use the vehicle key 320 to operate the vehicle 310. However, according to arrangements described herein, if the valet attempts to access the data store of personal information 115 of the navigation system 100, the valet will be prevented from doing so. The valet will be prompted to provide suitable authentication.

If the navigation system 100 is configured to unlock based on detecting a signal from the vehicle key 320, the user can provide the valet with the valet key 350, which would not generate the predetermined signal or would otherwise not be recognized by the navigation system 100. As a result, the data store of personal information 115 will remain locked.

Alternatively or in addition, the navigation system 100 can be configured to require two or more types of authentication. Thus, even if a user provides the vehicle key 320 to the valet and if one of the types of authentication is a predetermined signal from the vehicle key 320, the data store of personal information 115 will remain locked unless a second type of authentication is provided.

As another example, a user may allow a friend or family member to use the vehicle 310. In such case, the user may provide the vehicle key 320 to the other person. However, the user may not want for such a person to view or have access to his or her personal information on the navigation system 100. Such access can be prevented by configuring the navigation system 100 so that the predetermined signal from the vehicle key 320 is not a recognized type of authentication. Alternatively, if the predetermined signal from the vehicle key 320 is a recognized type of authentication, at least one other form of authentication can be required to unlock the navigation system 100. In these manners, a user can allow another person to have full use of the vehicle 310 and the navigation system 100, except for access to and/or use of the personal information data store 115.

Figure 4:
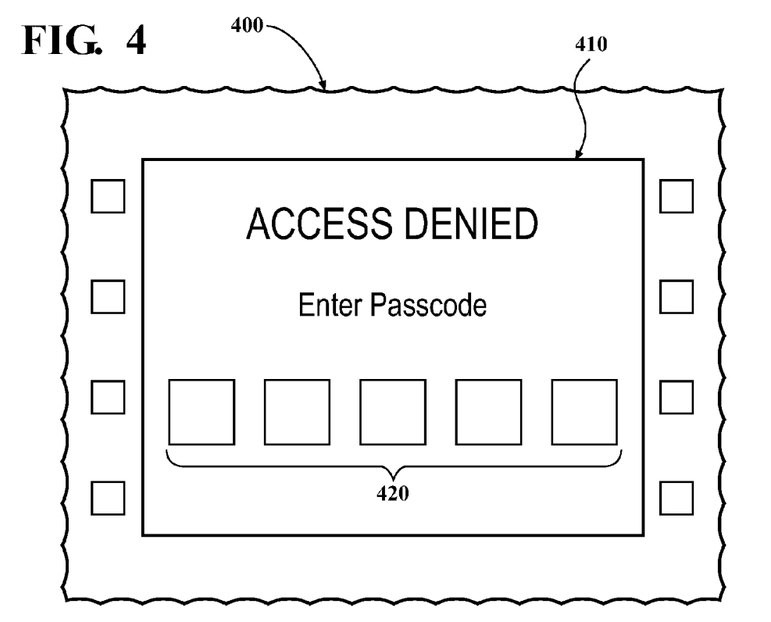
FIG. 4 is an example of an authentication input screen for a navigation system.

Another non-limiting example of protecting personal information operatively associated with a navigation system in accordance with systems and methods described herein will now be presented in relation to FIG. 4. As noted above, when a request to access or use the data store of personal information 115 is received, a user can be prompted to provide authentication to unlock the data store of personal information. Any suitable form of prompting can be provided. For instance, a user can be presented with an authentication input screen. FIG. 4 shows one example of an authentication input screen 405. The authentication input screen 405 can have any suitable form, content and features. Thus, it will be understood that the authentication input screen 405 shown in FIG. 4 is provided merely as an example and is not intended to be limiting.

In one or more arrangements, the authentication input screen 405 can be presented on a display 400 of the navigation system 100 and/or the vehicle 310. The display 400 can be a part of the output system 165 and/or the input system 160 of the navigation system 100. In some arrangements, the display 400 can be a portion of another vehicle system, such as a vehicle radio or audio system, a backup camera display and/or other vehicle monitor. A "display" is defined as a component or a group of components that present information/data in visual form, including, for example, video, images, graphics, etc. In one or more arrangements, the display 400 can be located in a front interior portion of a vehicle. For instance, the display 400 can be included in a dashboard or instrument panel (not shown) of a vehicle.

The display 400 can be any suitable type of display. The display 400 can be any suitable type of display. For instance, the display 400 can be a liquid crystal display (LCD), a light emitting diode (LED) display or some other suitable display. In one or more arrangements, the display 400 can be a touch screen display, a multi-touch display or a remotely controlled display. A touch screen can allow a user to engage or interact with one or more displayed elements, such as a graphical user interface (GUI), and/or other applications running on any vehicle system, including any of those described herein, through contact with the display 400. For example, a user may make selections and move a cursor by simply touching the display 400 via a finger or stylus.

The authentication input screen 405 can be configured to receive suitable user authentication to unlock the portal so as to permit access thereto. For example, the user authentication input screen 405 can provide user interface elements, such as one or more fields 420, to receive a user authentication input. In the example shown in FIG. 4, the authentication can be a password. The password can have any quantity of characters and can be expressed in any suitable form.

Alternatively or in addition to any one or more of the above forms of authentication, biometrics can be collected by a system component to authenticate a user. For instance, retinal, iris, facial, palm, fingerprint and/or voice recognition technologies can be implemented to authenticate a user. Thus, the device can include a suitable camera, scanner or sensor for retinal, iris, facial, palm and/or fingerprint recognition. The user input interface may include a microphone for voice recognition.

A biometric sample of the user can be collected. As an example, an image of a portion of the user's body, such as the face, iris and/or retina, can be captured. To that end, the camera, a sensor or scanner can be activated and can be used to capture the image. In one embodiment, the camera can be configured to capture an image of a portion of the user's body (e.g. the user's face). To that end, the camera and/or the biometric collection system 140 can be adapted to detect the relevant portion of the user's body.

The capturing of the image of a portion of the user's body may be performed automatically without providing notice to the user. Alternatively or in addition, the navigation system 100 can notify the user of the impending action to capture an image or make a scan. In some instances, the navigation system 100 can provide instructions to a user so that a suitable image can be captured. The camera can take a single image or a plurality of images.

Alternatively or in addition to capturing an image of a portion of the user's body, other user biometric samples can be collected. Moreover, arrangements described are not limited to the use of a camera. As an example, the biometric sample can be a fingerprint or palm scan. To that end, a fingerprint scanner or sensor can be used to collect at least a portion of one or more of a user's fingerprints and/or palms. Alternatively or in addition, the biometric sample can be the user's voice. In such case, a sample of the user's voice can be collected by any suitable audio recording device.

Once collected, the biometric sample of the user can be compared to the data store of user biometric data 120. Continuing the example of capturing a user image, the captured image of the user can be compared to a database of user images. Such comparison may be done by facial recognition software or by some other software, device, component or system. If the captured image does not match any of the images in the database of user images, then the data store of personal information 115 can remain locked. On the other hand, if the captured image of the user matches one of the images in the database of user images, then the data store of personal information 115 can be unlocked. In this context, "matches" or "match" means an exact match between a user biometric sample (e.g., the captured image) and an item in a user biometric database (e.g., an image in the database of user images). In some embodiments, "matches" or "match" can also mean that the user biometric sample (e.g. the captured image) and an item in a user biometric database (e.g., an image in the database of user images) match within a predetermined probability (such as at least about 85%, at least about 90%, at least about 95% or greater) or confidence level.

The arrangements shown in FIG. 4 and elsewhere herein can be beneficial in numerous situations. As an example, arrangements described herein can be beneficial if the navigation system 100 or a vehicle containing the navigation system 100 is stolen. Arrangements described herein can prevent a thief or other unauthorized user from obtaining personal information from the navigation system 100. For instance, the navigation system 100 may store data reflecting the name and home address of the user. Such information would be locked as described herein, thereby preventing it from being viewed, accessed and/or used.

It will be appreciated that arrangements described herein can provide numerous benefits, including one or more of the benefits mentioned herein. For example, arrangements described herein can prevent personal information from being viewed, accessed or used by an unauthorized user. Arrangements described herein can provide privacy and/or security to a user. Arrangements described herein can provide comfort and peace of mind to a user that information or data input into the navigation system will be protected. The arrangements described herein can also minimize the possibility that personal information stored on a navigation system from being misused for fraud, theft or other criminal activity. Arrangements described herein can be implemented without overly burdening a user of the navigation system. Further, arrangements described herein can be implemented so that, despite the data store of personal information being locked, the navigation system can remain operable. Thus, arrangements described herein do not interfere with the use of the navigation system.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of protecting personal information associated with a navigation system, a data store of personal information being operatively connected to the navigation system, the method comprising:
   locking the data store of personal information, whereby access to and/or use of the data store of personal information is prevented, the navigation system remaining operable despite the data store of personal information being locked;
   responsive to a receiving a request to access a data store of personal information, prompting a user to provide authentication to unlock the data store of personal information, the promoting including:
      prompting the user for a first type of authentication, the first type of authentication being a predetermined vehicle key signal; and
      prompting the user for a second type of authentication, the second type of authentication being different than the first type of authentication;
   responsive to receiving the first type of authentication, determining whether the received first type of authentication is correct or incorrect; and
   responsive to receiving the second type of authentication, determining whether the received second type of authentication is correct or incorrect,
   wherein the data store of personal information is unlocked if the received first type of authentication and the received second type of authentication are both correct, and
   wherein the data store of personal information remains locked if:
      at least one of the received first type of authentication or the received second type of authentication is incorrect, or
      if at least one of the first type of authentication or the second type of authentication is not received.

2. The method of claim 1, wherein the second type of authentication is a password, and wherein prompting the user for the second type of authentication includes prompting a user to input a password.

3. The method of claim 1, wherein prompting the user for the first type of authentication includes scanning to detect a key signal.

4. The method of claim 3, wherein scanning to detect the key signal includes scanning to detect the key signal within a predetermined distance of the navigation system.

5. The method of claim 1, wherein the second type of authentication is a biometric identifier, and wherein prompting the user for the second type of authentication includes collecting a biometric sample.

6. The method of claim 1, wherein locking the data store of personal information is performed when the navigation system has not been in use for a predetermined period of time.

7. The method of claim 1, wherein locking the data store of personal information is performed automatically upon start up or shut down of the navigation system.

8. The method of claim 1, wherein locking the data store of personal information is performed responsive to receiving a user input or command.

9. The method of claim 1, wherein locking the data store of personal information is performed regardless of whether the navigation system is locked or unlocked.

10. A system for protecting personal information associated with a navigation system, the system comprising:
a navigation system, the navigation system including:
a data store of personal information; and
a processor operatively connected to the data store of personal information, the processor being programmed to initiate executable operations comprising:
locking the data store of personal information, whereby access to and/or use of the data store of personal information is prevented, the navigation system remaining operable despite the data store of personal information being locked;
responsive to a receiving a request to access a data store of personal information, prompting a user to provide authentication to unlock the data store of personal information, the prompting including:
prompting the user for a first type of authentication, the first type of authentication being a predetermined vehicle key signal; and
prompting the user for a second type of authentication, the second type of authentication being different than the first type of authentication;
responsive to receiving the first type of authentication, determining whether the received first type of authentication is correct or incorrect; and
responsive to receiving the second type of authentication, determining whether the received second type of authentication is correct or incorrect,
wherein the data store of personal information is unlocked if the received first type of authentication and the received second type of authentication are both correct, and
wherein the data store of personal information remains locked if:
at least one of the received first type of authentication or the received second type of authentication is incorrect, or
if at least one of the first type of authentication or the second type of authentication is not received.

11. The system of claim 10, further including:
a display operatively connected to the processor, and
wherein the second type of authentication is a password, and wherein promoting the user for the second type of authentication includes prompting, on the display, the user to input a password.

12. The system of claim 10, further including:
a sensor system operatively connected to the processor, wherein the sensor system is configured to detect a predetermined vehicle key signal, and
wherein prompting the user for the first type of authentication includes scanning, using the sensor system, to detect the predetermined vehicle key signal.

13. The system of claim 10, further including:
a biometric collection system operatively connected to the processor, wherein the biometric collection system is configured to collect a biometric sample from a user, and
wherein the second type of authentication is a biometric identifier, and wherein promoting the user for the second type of authentication includes collecting, using the biometric collection system, a biometric sample from a user.

14. The system of claim 10, wherein locking the data store of personal information is performed when the navigation system has not been in use for a predetermined period of time.

15. The system of claim 10, wherein locking the data store of personal information is performed automatically upon start up or shut down of the navigation system.

16. The system of claim 10, wherein locking the data store of personal information is performed responsive to receiving a user input or command.

17. The system of claim 10, wherein the navigation system is configured to be selectively locked and unlocked, and wherein locking the data store of personal information is performed regardless of whether the navigation system is locked or unlocked.

* * * * *

UNITED STATES PATENT AND TRADEMARK OFFICE
CERTIFICATE OF CORRECTION

PATENT NO. : 9,489,537 B2
APPLICATION NO. : 14/595643
DATED : November 8, 2016
INVENTOR(S) : Wippler Page 1 of 1

It is certified that error appears in the above-identified patent and that said Letters Patent is hereby corrected as shown below:

In the Claims

In Claim 1, Column 16, Line 14, delete "promoting" and insert --prompting--.

In Claim 11, Column 18, Line 4, delete "promoting" and insert --prompting--.

In Claim 13, Column 18, Line 20, delete "promoting" and insert --prompting--.

Signed and Sealed this
Seventeenth Day of April, 2018

Andrei Iancu
*Director of the United States Patent and Trademark Office*